(12) United States Patent
La Rosa

(10) Patent No.: US 12,322,977 B2
(45) Date of Patent: Jun. 3, 2025

(54) METHOD OF CONFIGURING A WIRELESS DEVICE, CORRESPONDING WIRELESS DEVICE AND BASE STATION

(71) Applicant: STMicroelectronics S.r.l., Agrate Brianza (IT)

(72) Inventor: Roberto La Rosa, Catania (IT)

(73) Assignee: STMicroelectronics S.r.l., Agrate Brianza (IT)

(*) Notice: Subject to any disclaimer, the term of this patent is extended or adjusted under 35 U.S.C. 154(b) by 422 days.

(21) Appl. No.: 17/861,807

(22) Filed: Jul. 11, 2022

(65) Prior Publication Data

US 2023/0027724 A1    Jan. 26, 2023

(30) Foreign Application Priority Data

Jul. 13, 2021 (IT) .................. 102021000018437

(51) Int. Cl.
*H02J 50/00* (2016.01)
*H04W 8/24* (2009.01)

(52) U.S. Cl.
CPC ........... *H02J 50/001* (2020.01); *H04W 8/245* (2013.01)

(58) Field of Classification Search
CPC ........ H02J 50/001; H02J 50/80; Y02D 30/70; H04W 52/0216; H04W 72/23; H04W 72/51; H04W 52/0235; H04W 76/28; H04W 4/80; H04W 52/0296; H04W 84/18
See application file for complete search history.

(56) References Cited

U.S. PATENT DOCUMENTS

| | | | |
|---|---|---|---|
| 10,279,757 B2 | 5/2019 | Netter | |
| 11,232,480 B1* | 1/2022 | Pollock | G06Q 30/0252 |
| 2017/0013561 A1 | 1/2017 | Soldati | |
| 2022/0312315 A1* | 9/2022 | Xu | H02J 50/20 |
| 2022/0376555 A1* | 11/2022 | Landis | H04B 7/15528 |

FOREIGN PATENT DOCUMENTS

EP    2428000 B1    8/2012

OTHER PUBLICATIONS

IT Search Report and Written Opinion for priority application, IT Appl. 102021000018437, report dated Mar. 8, 2022, 7 pgs.

* cited by examiner

*Primary Examiner* — Olumide Ajibade Akonai
(74) *Attorney, Agent, or Firm* — Crowe & Dunlevy LLC

(57) ABSTRACT

A wireless device includes an energy harvester and an energy storage that operate in a sequence of energy harvesting cycles to alternately harvest energy and release energy for supplying the wireless device. The wireless device also includes a processing circuit and a wireless communication circuit. A configuration method for the wireless device includes first step where a base station receives a signal from the wireless device indicating wireless communication circuit entry into a receiving operation mode. In a second step, the base station transmits configuration data to the wireless device. The received configuration data is temporarily stored in a memory area of the wireless communication circuit. In a third step, the temporarily stored configuration data is transmitted from the wireless communication circuit to the processing circuit for storage in a memory area. The second and third steps are carried out during distinct energy harvesting cycles of the wireless device.

15 Claims, 2 Drawing Sheets

METHOD OF CONFIGURING A WIRELESS DEVICE, CORRESPONDING WIRELESS DEVICE AND BASE STATION

PRIORITY CLAIM

This application claims the priority benefit of Italian Application for Patent No. 102021000018437, filed on Jul. 13, 2021, the content of which is hereby incorporated by reference in its entirety to the maximum extent allowable by law.

TECHNICAL FIELD

The description relates to energy-autonomous, battery-free electronic devices, such as wireless sensor nodes for use in wireless sensor networks.

BACKGROUND

Conventional wireless sensor nodes (WSN) for use in wireless sensor networks are usually powered by batteries. This results in significant limitations as to where the wireless sensor nodes can be installed, to the node lifetime, and to the maximum number of deployable devices (e.g., the maximum number of devices included in a single wireless sensor network).

However, Internet-of-Things (IoT) applications are increasingly demanding a large plurality of interconnected wireless sensor nodes, which benefit from being maintenance free and sufficiently inexpensive. Therefore, energy-autonomous, battery-free wireless sensor nodes (EABFWSN) have been proposed, which rely on harvesting energy from the surrounding environment to perform their detection, measurement and/or communication (e.g., radio communication) functions. The energy harvested by an energy harvester of the wireless sensor node may be stored in a capacitor of the wireless sensor node.

In order to be adaptable to different use cases, such wireless sensor nodes may be configurable, reconfigurable and/or may be subject to firmware updates (e.g., after deployment). Configuring, reconfiguring and/or updating the firmware of a wireless sensor node may require a high amount of energy, usually higher than the energy provided by the conventional energy harvesting circuitry included in the wireless sensor node. Additionally, environmental energy that can be harvested is neither constant nor predictable over time, therefore configuration, reconfiguration and/or update cannot be performed unless the wireless device is connected to a stable and reliable power source (e.g., a battery, mains electricity, or power transferred wirelessly from a neighboring device) during the configuration, reconfiguration and/or update operation. The necessity of connection to a stable power source, together with the fact that the wireless sensor nodes are often placed in hard-to-reach places, makes the configuration, reconfiguration and/or firmware update operation inconvenient and expensive.

Therefore, there is a need in the art to provide energy-autonomous, battery-free devices having an improved "over-the-air" (OTA) configuration, reconfiguration and/or update procedure.

SUMMARY

One or more embodiments contribute in providing such energy-autonomous, battery-free devices implementing an improved OTA configuration, reconfiguration and/or update procedure.

One or more embodiments may relate to method.

One or more embodiments may relate to a corresponding wireless device.

One or more embodiments may relate to a corresponding base station for use in a wireless sensor network.

In one or more embodiments, a wireless device may include an energy harvester and an energy storage element coupled to the energy harvester, the energy harvester and the energy storage element being configured (e.g., controlled) to alternately harvest energy from a surrounding environment and release energy for supplying the wireless device in a sequence of energy harvesting cycles. The wireless device may also include a processing circuit and a wireless communication circuit. A method of configuring the wireless device may comprise: i) receiving at a base station, from the wireless device, a signal indicative of the wireless communication circuit entering a receiving operation mode; ii) as a result of the wireless communication circuit entering a receiving operation mode, transmitting configuration data from the base station to the wireless device and temporarily storing, in a memory area of the wireless communication circuit, the configuration data received; and iii) transmitting from the wireless communication circuit to the processing circuit the temporarily stored configuration data, and storing, in a memory area of the processing circuit, the received configuration data. Steps ii) and iii) may be carried out during distinct (e.g., different) energy harvesting cycles of the wireless device.

One or more embodiments may thus facilitate carrying out an OTA configuration, reconfiguration and/or update procedure of the wireless device.

In one or more embodiments, a configuration method may further comprise: iv) erasing the configuration data temporarily stored in the memory area of the wireless communication circuit. Step iv) may be carried out during a distinct (e.g., different) energy harvesting cycle of the wireless device with respect to the energy harvesting cycles during which steps ii) and iii) are carried out.

In one or more embodiments, steps ii) and iii), and optionally step iv), may be carried out during subsequent energy harvesting cycles of the wireless device.

In one or more embodiments, a configuration method may further comprise checking whether the data stored in the memory area of the wireless communication circuit is different from a reference value. Step iii) may be performed in response to the data stored in the memory area of the wireless communication circuit being different from the reference value.

In one or more embodiments, a configuration method may further comprise transmitting as comparison data, from the wireless device to the base station, the configuration data stored in the memory area of the processing circuit; comparing, at the base station, the comparison data with the configuration data previously transmitted from the base station to the wireless device; and terminating transmission of the configuration data by the base station in response to the comparison data being equal to the configuration data previously transmitted from the base station to the wireless device.

In one or more embodiments, a configuration method may further comprise receiving periodically from the wireless device, at the base station, information data indicative of the amount of energy stored in the energy storage element of the wireless device. Steps ii) and iii), and optionally step iv), may be carried out in response to the amount of energy stored in the energy storage element being higher than a certain threshold.

In one or more embodiments, transmitting from the wireless communication circuit to the processing circuit the temporarily stored configuration data may comprise transmitting the temporarily stored configuration data via one of: a UART communication interface, a low-power UART communication interface, an SPI communication interface or an I2C communication interface.

In one or more embodiments, a wireless device (e.g., a wireless sensor node for use in a wireless sensor network) may include an energy harvester, an energy storage element coupled to the energy harvester, a processing circuit, and a wireless communication circuit. The energy harvester and the energy storage element may be configured (e.g., controlled) to alternately harvest energy from a surrounding environment and release energy for supplying the wireless device in a sequence of energy harvesting cycles. The wireless communication circuit may be configured to: i) transmit towards a base station a signal indicative of the wireless communication circuit entering a receiving operation mode; ii) as a result of the wireless communication circuit entering a receiving operation mode, receive from the base station configuration data and temporarily store, in a memory area of the wireless communication circuit, the received configuration data; and iii) transmit to the processing circuit the temporarily stored configuration data, and store, in a memory area of the processing circuit, the received configuration data. Steps ii) and iii) may be carried out during distinct (e.g., different) energy harvesting cycles of the wireless device.

In one or more embodiments, the wireless communication circuit of the wireless device may be configured to periodically switch between a transmitting operation mode and the receiving operation mode.

In one or more embodiments, the wireless communication circuit of the wireless device may include a Bluetooth radio, such as a Bluetooth Low-Energy radio.

In one or more embodiments the processing circuit and the wireless communication circuit of the wireless device may be configured to exchange signals there between in half-duplex mode.

In one or more embodiments the wireless device may comprise a UART communication interface, a low-power UART communication interface, an SPI communication interface or an I2C communication interface between the processing circuit and the wireless communication circuit.

In one or more embodiments, a base station for use in a wireless sensor network may include a respective wireless communication circuit. The respective wireless communication circuit may be configured to: i) receive from a wireless device a signal indicative of a wireless communication circuit of the wireless device entering a receiving operation mode; and ii) as a result of the wireless communication circuit of the wireless device entering a receiving operation mode, transmit to the wireless device configuration data.

In one or more embodiments, the wireless communication circuit of the base station may include a Bluetooth radio, such as a Bluetooth Low-Energy radio.

BRIEF DESCRIPTION OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Figure 1:
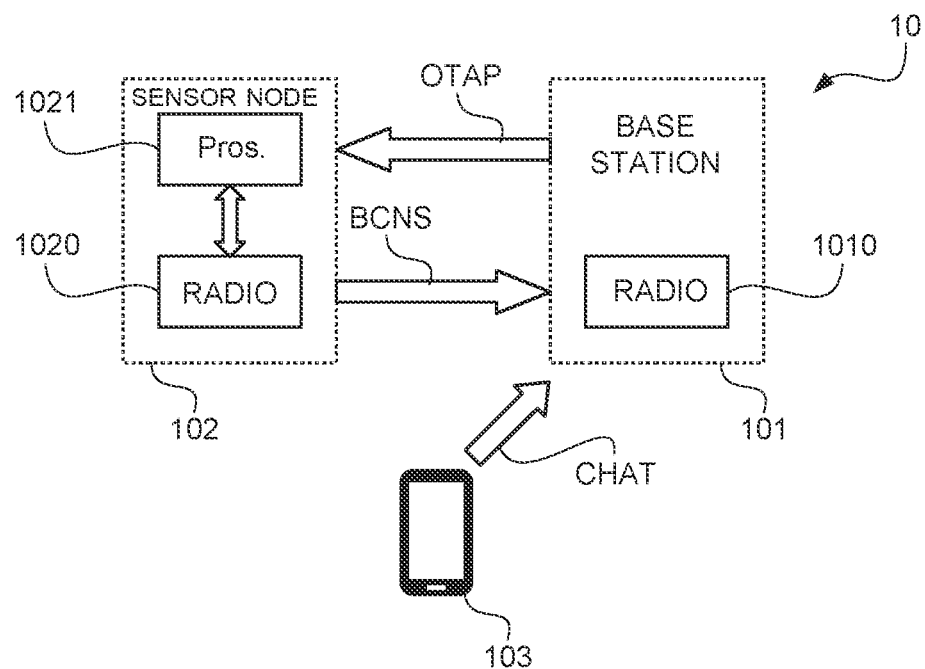
FIG. 1 is a block diagram exemplary of a wireless sensor network according to one or more embodiments of the present description.

By way of introduction to the detailed description of exemplary embodiments, reference may first be made to FIG. 1, which is a block diagram exemplary of a wireless sensor network 10.

A wireless sensor network 10 according to one or more embodiments may comprise a base station 101 and at least one wireless device 102 (e.g., an energy-autonomous, battery-free wireless sensor node—EABFWSN). The wireless device 102 may be provided with energy harvesting circuitry known per se configured to harvest energy from the environment where the device 102 is placed (e.g., solar energy, thermal energy, electromagnetic energy, and the like). The harvested energy may be stored in an energy storage element of the wireless device 102, e.g., a capacitor. The base station 101 may comprise a wireless communication apparatus or radio 1010, e.g., a Bluetooth radio, such as a Bluetooth Low-Energy (BLE) radio. The wireless device 102 may comprise a wireless communication apparatus or radio 1020, e.g., a Bluetooth radio, such as a Bluetooth Low-Energy (BLE) radio. The radio communication apparatuses 1010 and/or 1020 may be included in respective system-on-chips providing also other functions. For instance, the devices available with companies of the STMicroelectronics group under the trade designation "BlueNRG-2 BLE Wireless System-on-Chip", as disclosed by document "BlueNRG-2 Bluetooth® Low Energy wireless system-on-chip", DS12166—Rev 7—December 2020 (incorporated by reference), available online at st.com, are exemplary of such system-on-chips suitable for use in one or more embodiments.

The base station 101 and the wireless device 102 may thus exchange data wirelessly. The base station 101 may receive, collect and process the data BCNS (e.g., sensor data) transmitted (e.g., by use of radio beacons) by the wireless device 102. The wireless device 102 may receive, collect and process the data OTAP (e.g., configuration data) transmitted by the base station 101.

The wireless device 102 may additionally comprise a processing unit (Pros.) 1021 (e.g., a low-power or ultra-low-power microcontroller unit) operatively coupled to the radio communication apparatus 1020 to exchange data therewith. For instance, the microcontrollers available with companies of the STMicroelectronics group under the trade designations STM32L052x6 and STM32L052x8, as disclosed by document "STM32L052x6 STM32L052x8—Ultra-low-power 32-bit MCU Arm®-based Cortex®-M0+, up to 64 KB Flash memory, 8 KB SRAM, 2 KB EEPROM, USB, ADC, DAC", DS10182 Rev 10—February 2021 (incorporated by reference), available online at st.com, are exemplary of such microcontrollers suitable for use in one or more embodiments. Therefore, data OTAP received from the base station 101 may be transmitted to the processing unit 1021, e.g., to carry out a configuration, reconfiguration and/or firmware update of the processing unit 1021.

As exemplified in FIG. 1, the base station 101 may additionally exchange data CHAT (by use of a wireless or wired connection) with a control device or user device 103. The control device 103 may include a mobile device such as, for instance, a smart phone.

Figure 2:
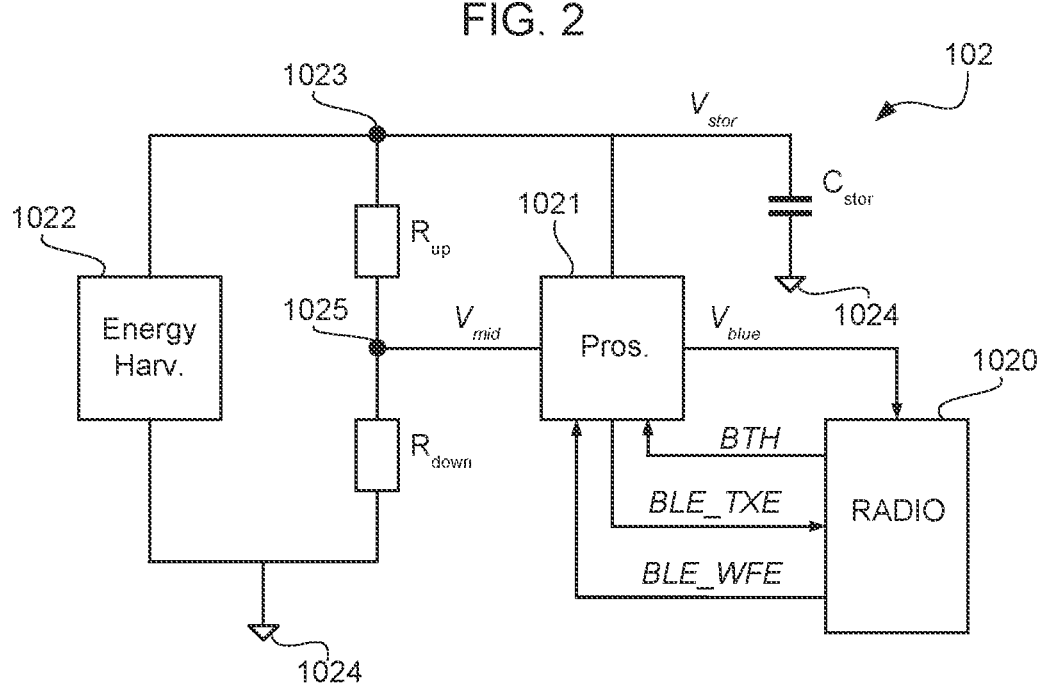
FIG. 2 is a circuit block diagram exemplary of a wireless sensor node according to one or more embodiments of the present description.

FIG. 2 is a circuit block diagram exemplary of certain components of a wireless device (sensor node) 102. As anticipated, the wireless device 102 may comprise a wireless communication apparatus 1020 (also referred to as radio 1020 in the following) and a processing unit 1021 operatively coupled to the radio 1020. The processing unit 1021 may provide a radio supply voltage $V_{blue}$ to the radio 1020 (e.g., via a general purpose input/output, GPIO, pin of the processing unit 1021), and may exchange signals with the radio 1020. For instance, a signal BTH and a signal BLE_WFE may be transmitted to the processing unit 1021 from the radio 1020, and/or a signal BLE_TXE may be transmitted to the radio 1020 from the processing unit 1021. Operation of the wireless device 102 involving such signals is further discussed in the following.

Additionally, the wireless device 102 may comprise an energy harvester 1022 known per se (e.g., a photovoltaic cell, a thermoelectric generator, an inductive generator, and the like) configured to produce an output voltage $V_{stor}$ between a positive supply voltage node 1023 and a reference supply voltage node 1024. Energy harvested by the energy harvester 1022 may be stored in a capacitor $C_{stor}$ arranged between nodes 1023 and 1024. The energy stored in the capacitor $C_{stor}$ may be released to supply the electronic circuits included in the wireless device 102. For instance, the microcontroller 1021 may be configured to receive the supply voltage $V_{stor}$ from node 1023, and/or a further supply voltage $V_{mid}$ produced at an intermediate node 1025 of a voltage divider circuit. The voltage divider circuit may comprise a first resistor $R_{up}$ and a second resistor $R_{down}$ arranged in series between nodes 1023 and 1024, with node 1025 arranged between the two resistors $R_{up}$ and $R_{down}$. Therefore, the further supply voltage $V_{mid}$ may be lower than the supply voltage $V_{stor}$, which in turn may be equal to or lower than 3.3 V.

Figure 3A:
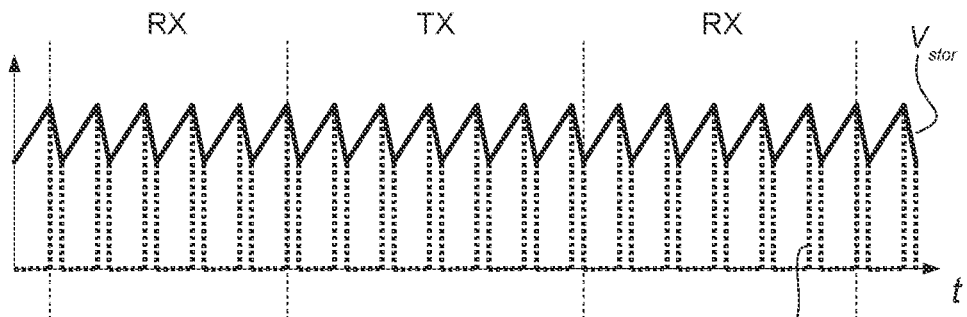
FIGS. 3A and 3B are time diagrams of signals exemplary of operation of one or more embodiments of the present description.
Figure 3B:
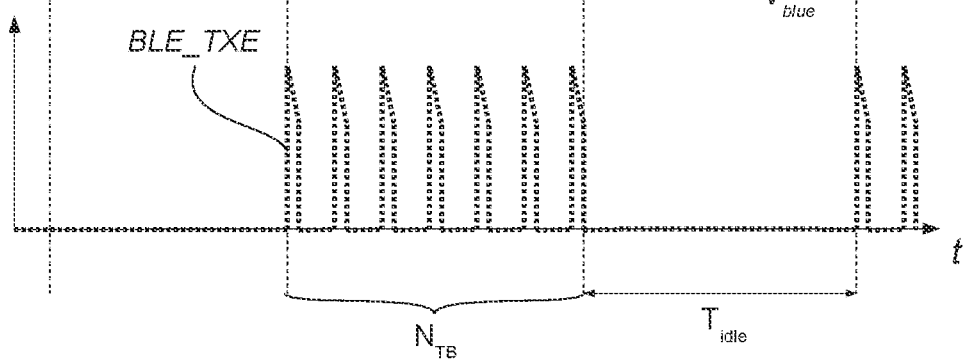

In a wireless sensor network 10, the wireless device 102 may operate as exemplified in FIGS. 3A and 3B to communicate with the base station 101. FIG. 3A is a time diagram exemplary of the voltage signals $V_{stor}$ (solid line) and $V_{blue}$ (dotted line), while FIG. 3B is a time diagram exemplary of the transmission control signal BLE_TXE (dotted line). As exemplified in FIGS. 3A and 3B, the wireless device 102 may alternate a transmission phase TX (e.g., during which the radio 1020 such as a BLE radio is configured in non-connectable advertising mode) and a reception phase RX (e.g., during which the radio 1020 is configured in a receiving mode such as a scan mode). During the TX phase, the radio 1020 may send a number of beacons $N_{TB}$ (e.g., a fixed or programmable number) to the base station 101 (e.g., seven beacons as exemplified in FIGS. 3A and 3B). The RX phase may have a duration equal to $T_{idle}$ (e.g., a fixed or programmable duration).

It is noted that operation of the base station 101 may not be subject to power consumption constraints, insofar as power may be easily available to the base station (e.g., by use of mains electricity). Therefore, the base station 101 can carry out complex and power-demanding tasks. The OTA configuration of the wireless device 102 may regard, for instance, various parameters such as the level of power transmitted during the TX phase, the duration $T_{idle}$ of the RX phase, the number $N_{TB}$ of beacons transmitted during the TX phase, and the like. In order to configure the wireless device 102 over the air, a reliable and stable connection has to be provided between the configuring device (e.g., the base station 101) and the wireless device 102 for a time sufficiently long to complete the configuration procedure. Therefore, the base station 101 may conveniently collect information about the amount of energy available to the wireless device (e.g., the state of charge of the capacitor $C_{stor}$) on a regular basis (e.g., periodically).

As anticipated with reference to FIG. 1, the base station 101 may include two communication interfaces.

A first communication interface may be provided between the user device 103 and the base station 101. The user device 103 (possibly operated by a user) can send the configuration data for the wireless device 102 to the base station 101, e.g., via an application (software) installed on the user device 103 (e.g., a smart phone). Since both the user device 103 and the base station 101 may be easily supplied with power, the user can conveniently send, through the user device 103, the desired amount of data to the base station without time and/or power constraints.

A second communication interface may be provided between the base station 101 and the wireless device 102. The base station 101 may be informed about the status of the wireless device 102 (e.g., about its charge status), e.g., at all times, via the second communication interface. For instance, the base station 101 may be informed when the wireless device 102 has terminated the TX phase and enters the RX phase. Based on this, the wireless device 102 may operate in observation mode during the RX phase. The base station 101 may transmit the configuration parameters to the wireless device 102 after the transmission phase (e.g., immediately after the end of the TX phase). The base station 101 is aware that, by transmitting the configuration data right after the end of the TX phase of the wireless device 102, it will find the wireless device 102 in the RX mode.

The above-discussed system architecture may be advantageous insofar as the observation (RX) phase can last several seconds and, during this time, depending on the available environmental energy, the wireless device 102 will perform several cycles in observation mode. Therefore, the base station 101 may rely on the availability of a certain number of energy cycles to carry out an over-the-air configuration (OTAC) procedure.

In one or more embodiments, the communication between the radio 1020 (e.g., a radio integrated circuit) and the microcontroller 1021 (e.g., a microcontroller integrated circuit) may be of the half-duplex type. Data may be sent only from the radio 1020 to the microcontroller 1021. Communication between the circuits 1020 and 1021 may rely on breaking up the communication content into small pieces (e.g., blocks) of information, with each piece transmitted in a different energy harvesting cycle of the wireless device 102. Therefore, the base station 101 being informed about the current status of the wireless device 102 facilitates synchronizing the communication operations and therefore improves the management of data communication.

Once the configuration parameters are received by the radio 1020, they are to be transferred to the microcontroller 1021 while monitoring the energy available for completing the transfer process, so that the wireless device 102 does not run out of power during transfer of the configuration data towards the microcontroller 1021.

Therefore, one or more embodiments may rely on reducing (e.g., minimizing) as much as possible the energy spent by the data transfer between the radio 1020 and the microcontroller 1021. In order to do so, an appropriate serial interface between the radio 1020 and the microcontroller 1021 may be used, such as a UART interface, an SPI interface, or an Inter-Integrated Circuit (I2C) interface. For instance, the reference Mikhaylov, K., et al., "Evaluation of Power Efficiency for Digital Serial Interfaces of Microcontrollers," 2012 5th International Conference on New Technologies, Mobility and Security (NTMS), pages 1-5, 2012 (incorporated by reference) discloses that an SPI interface has a typical energy consumption of 2.5 µJ per byte, and a UART interface has a typical energy consumption of 7.3 µJ per byte.

In one or more embodiments, the microcontroller 1021 may include a low-power UART (LPUART) interface that may consume about 50% more power than an SPI interface for each transmitted byte (e.g., about 5 µJ per byte). However, a LPUART interface may provide an advantageous trade-off between power consumption and the number of GPIOs required.

Therefore, in order to perform an OTA configuration procedure, the communication between the base station 101 and the radio 1020, as well as the communication between the radio 1020 and the microcontroller 1021, may be managed taking into account an energy-efficient approach. That communication may consume an amount of energy $E_{OTAC}$ computed according to equation 1 reproduced below:

$$E_{OTAC}=E_{BLE\_RX}+E_{MCU}+E_{UART}+E_M \quad (1)$$

In detail, $E_{BLE\_RX}$ is the energy consumed by the radio 1020 while operating in scanning mode (RX phase). For instance, $E_{BLE\_RX}$ may be about 42 µJ provided that the radio 1020 operates with a scanning window of 10 ms (minimum value) and a scanning interval ($T_{idle}$) of 100 ms.

In detail, $E_{MCU}$ is the energy consumed by the microcontroller 1021 during the communication procedure. For instance, $E_{MCU}$ may be about 4 µJ provided that the microcontroller 1021 operates in run mode with a CPU clock frequency of 131 kHz and an internal voltage regulator configured to provide an output voltage of 1.8 V.

In detail, $E_{UART}$ is the energy consumed by the UART communication interface between the radio 1020 and the microcontroller 1021. The energy $E_{UART}$ may be computed as the sum of a contribution $E_{UART\_BLE}$ and a contribution $E_{LPUART\_MCU}$. The contribution $E_{UART\_BLE}$ is the energy consumed by the UART interface of the radio 1020 to transmit 2 bytes (e.g., 1 byte for $T_{idle}$ and 1 byte for $N_{TB}$) to the microcontroller 1021, which may be about 10 µJ. The contribution $E_{LPUART\_MCU}$ is the energy consumed by the UART interface of the microcontroller 1021 to receive 2 bytes (e.g., 1 byte for $T_{idle}$ and 1 byte for $N_{TB}$) from the radio 1020, which may be about 10 tµJ. Therefore, the energy $E_{UART}$ may be about 20 µJ.

In detail, $E_M$ is the energy consumed to program the memories (e.g., EEPROMs) of both the radio 1020 and the microcontroller 1021. The energy $E_M$ may be computed as the sum of a contribution $E_{M\_MCU}$, a contribution $E_{M\_BLE\_PE}$, and a contribution $E_{M\_BLE\_WR}$. The contribution $E_{M\_MCU}$ is the energy consumed to store 2 bytes of data into the memory of the microcontroller 1021; during this operation the microcontroller 1021 may consume on average about 500 µA of current for a programming time of about 4 ms, so that the energy $E_{M\_MCU}$ may be about 2.6 µJ=12 µJ. The contribution $E_{M\_BLE\_PE}$ is the energy consumed by the radio 1020 to erase an entire page of the radio memory (e.g., EEPROM memory); during this operation the radio 1020 may consume on average about 500 µA of current for a time of about 21.5 ms, so that the energy $E_{M\_BLE\_PE}$ may be about 32 µJ. The contribution $E_{M\_BLE\_WR}$ is the energy consumed to store 2 bytes of data into the memory of the radio 1020; during this operation the radio 1020 may consume on average about 500 µA of current for a programming time of about 44 µs, so that the energy $E_{M\_BLE\_WR}$ may be about 130 nJ. Therefore, the energy $E_M$ may be about 44 µJ.

Considering the exemplary amounts of energy discussed above, equation 1 indicates that the energy $E_{OTAC}$ consumed to perform the OTA configuration procedure may be in the order of 110 µJ, which is about 40% higher than the typical energy harvested during a single energy harvesting cycle by the wireless device 102 in many application cases ($E_{harvested} \approx 80$ µJ). It will be appreciated that an OTA configuration procedure may require exchange of two bytes of data, as exemplified herein, but in general there is no theoretical limit to the amount of data that can be exchanged during a configuration procedure.

Therefore, one or more embodiments may rely on partitioning the OTA configuration procedure into a number of distinct (e.g., separated in time) phases, each of which consumes an amount of energy equal to or lower than the energy accumulated in the storage capacitor $C_{stor}$ during a single energy harvesting cycle.

Purely by way of example, the OTA configuration procedure may be partitioned into three different phases. In the first configuration phase, data sent by the base station 101 may be received by the radio 1020 of the wireless device 102 and stored into the local memory (e.g., flash or EEPROM) of the radio 1020. The amount of energy $E_1$ consumed for these operations may be calculated according to equation 2 reproduced below:

$$E_1=E_{BLE\_RX}+E_{M\_BLE\_WR} \approx 42 \text{ µJ} \quad (2)$$

In the second configuration phase, the radio 1020 may transmit the data previously stored into the respective local memory, via a low-power UART interface, to the microcontroller 1021 that stores such data into the local memory (e.g., EEPROM) of the microcontroller 1021. Substantially, once powered the radio 1020 asserts the signal BLE_WFE to indicate to the microcontroller 1021 that new data have been stored in the memory of the radio 1020 that the microcontroller 1021 can fetch. Therefore, the microcontroller 1021 proceeds to fetch the data and subsequently stores such data in its internal memory and notifies the radio 1020 that the read operation is successfully terminated. The amount of energy $E_2$ consumed for these operations may be calculated according to equation 3 reproduced below:

$$E_2 = E_{MCU} + E_{UART} + E_{M\_MCU} \approx 36 \; \mu J \quad (3)$$

In the third configuration phase, the memory of the radio 1020 may be reinitialized. Substantially, the radio 1020 clears the data from its internal (e.g., flash) memory and is ready again in the next cycle to receive new data if available. The amount of energy $E_3$ consumed for this operation may be calculated according to equation 4 reproduced below:

$$E_3 = E_{M\_BLE\_PE} \approx 32 \; \mu J \quad (4)$$

Figure 4:
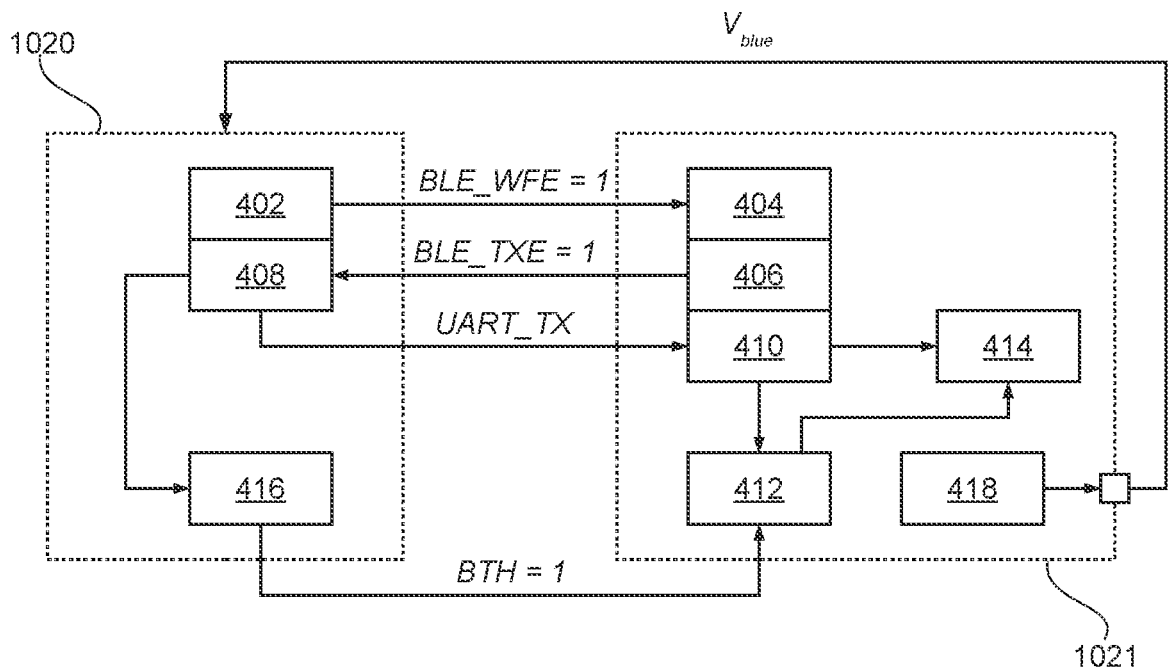
FIG. 4 is a circuit block diagram exemplary of operation of a wireless sensor node according to one or more embodiments of the present description.

Operation of one or more embodiments may be further understood with reference to FIG. 4, which is a diagram exemplary of possible operation steps executed by the radio 1020 and the microcontroller 1021 in one or more embodiments.

According to exemplary equations 2, 3 and 4, as a result of partitioning the OTA configuration procedure in smaller "tasks", the energy consumed to accomplish each of the tasks is lower than the typical energy harvested during a single energy harvesting cycle by the wireless device 102. One or more embodiments may thus provide a higher degree of freedom as to the number of data bytes exchanged, and may result in some extra energy margin that can be used to implement a wider scanning interval and/or to improve the efficiency of the radio communication between the wireless device 102 and the base station 101.

In one or more embodiments, the radio 1020 may be configured to store the received data and the current data in different reserved memory allocations so as to allow the operations previously discussed with reference to the "second" and "third" configuration phases. For instance, the radio 1020 may be configured to check (e.g., every time that the radio 1020 turns on) whether data was received and stored in the (e.g., flash) memory during the previous communication cycle. If the check reveals that new data are stored in the memory, the radio 1020 may immediately start a communication process with the microcontroller 1021. Otherwise, the radio 1020 may continue to operate as a radio beacon or data receiver. The check may be carried out comparing the received data value with a default initialization value. In case the value read from the local memory after the power-on of the radio 1020 is different from the initialization value, the radio 1020 may start a communication process with the microcontroller 1021 by asserting (e.g., setting to a high logic value) the signal BLE_WFE as exemplified by step 402 in FIG. 4 ("Flash programmed"). In response to the signal BLE_WFE received by the microcontroller 1021 being asserted, the LPUART interface of the microcontroller 1021 may be initialized as exemplified by step 404 in FIG. 4 ("LPUART initialize"). In response to the initialization of the LPUART interface, as exemplified by step 406 in FIG. 4 ("LPUART End of Init"), the microcontroller 1021 may toggle (e.g., assert) the signal BLE_TXE to acknowledge the radio 1020 that the microcontroller 1021 is ready to receive data. In response to a detected change of the state of signal BLE_TXE, the radio 1020 may start transmitting data to the microcontroller 1021 through the UART communication interface as exemplified by step 408 ("UART"), step 410 ("LPUART Communication") and signal UART_TX in FIG. 4. The microcontroller 1021 may read the data from signal UART_TX and store them in the respective memory (e.g., EEPROM memory) as exemplified by blocks 412 ("CPU") and step 414 ("EEPROM") in FIG. 4.

The radio 1020, after the data transmission, may write a specific word in a selected area of the respective memory that is checked after each power-up. This action results in the radio 1020 reinitializing the respective memory during the third configuration phase, as exemplified by step 416 ("Flash initialization") in FIG. 4. Once the data has been transmitted to the microcontroller 1021, the radio 1020 may assert the "BTH" (Back to Harvest) signal received at the CPU 412 so as to set again the wireless device 102 to the energy harvesting state (e.g., as soon as possible), as exemplified in FIG. 4.

FIG. 4 also exemplifies a GPIO interface 418 of the microcontroller 1021, configured to provide the radio supply voltage $V_{blue}$ to the radio 1020.

In one or more embodiments, an acknowledgment procedure may be implemented to signal successful data transmission. The configuration parameters $T_{idle}$ and $N_{TB}$ may be part of the BLE advertising data package so that, once the wireless device 102 has been re-configured and starts transmitting again, the base station 101 may be able to receive the configuration parameters of the wireless device 102 and compare them with those previously transmitted. If the comparison returns a positive outcome (i.e., in case the parameters previously transmitted by the base station 101 and those subsequently received from the wireless device 102 are the same), the base station 101 may stop sending the configuration data packets OTAP to the wireless device 102 and the configuration process is completed. Additionally, the wireless device 102 transmitting the configuration parameters may facilitate inspecting the configuration of the wireless device 102 via a Bluetooth sniffer or a smart phone app.

One or more embodiments may thus provide one or more of the following advantages:
  improved use flexibility of the wireless devices by use of easier configuration, reconfiguration and/or firmware update;
  possibility to introduce options and functional features with a low cost architecture;
  reduced maintenance cost; and
  possibility to easily configure a wireless device (e.g., an energy-autonomous, battery-free wireless sensor node) in a variety of different environments, e.g., also in harsh environments.

Without prejudice to the underlying principles, the details and embodiments may vary, even significantly, with respect to what has been described by way of example only, without departing from the extent of protection.

The claims are an integral part of the technical teaching provided herein in respect of the embodiments.

The extent of protection is determined by the annexed claims.

The invention claimed is:

1. A method of configuring a wireless device, wherein the wireless device includes: an energy harvester and an energy storage element coupled to the energy harvester, the energy harvester and the energy storage element being configured to alternately harvest energy from a surrounding environment and release energy for supplying the wireless device in a sequence of energy harvesting cycles; a processing circuit; and a wireless communication circuit;

the method comprising:
- i) receiving at a base station, from the wireless device, a signal indicative of said wireless communication circuit entering a receiving operation mode;
- ii) in response to the signal indicative of said wireless communication circuit entering the receiving operation mode, transmitting configuration data from the base station to the wireless device and temporarily storing the received configuration data in a memory area of said wireless communication circuit of the wireless device; and
- iii) transmitting from the wireless communication circuit to the processing circuit said temporarily stored configuration data, and storing the received configuration data in a memory area of said processing circuit of the wireless device;

wherein steps ii) and iii) are carried out during distinct energy harvesting cycles of the wireless device.

2. The method of claim 1, further comprising the step of iv) erasing said configuration data temporarily stored in said memory area of said wireless communication circuit, wherein step iv) is carried out during a distinct energy harvesting cycle of the wireless device with respect to the energy harvesting cycles during which are carried out steps ii) and iii).

3. The method of claim 2, wherein steps ii) and iii) are carried out during subsequent energy harvesting cycles of the wireless device.

4. The method of claim 2, wherein steps ii), iii) and iv) are carried out during subsequent energy harvesting cycles of the wireless device.

5. The method of claim 1, further comprising checking whether the data stored in said memory area of said wireless communication circuit is different from a reference value, and performing step iii) in response to said data stored in said memory area of said wireless communication circuit being different from the reference value.

6. The method of claim 1, further comprising:
- transmitting as comparison data, from the wireless device to the base station, the configuration data stored in said memory area of said processing circuit;
- comparing, at the base station, said comparison data with the configuration data previously transmitted from the base station to the wireless device; and
- terminating transmission of said configuration data by the base station in response to said comparison data being equal to the configuration data previously transmitted from the base station to the wireless device.

7. The method of claim 1, further comprising periodically receiving, at the base station, information data from the wireless device indicative of the amount of energy stored in said energy storage element of the wireless device.

8. The method of claim 7, wherein steps ii), iii) and iv) are carried out in response to the amount of energy stored in said energy storage element being higher than a certain threshold.

9. The method of claim 7, wherein steps ii) and iii) are carried out in response to the amount of energy stored in said energy storage element being higher than a certain threshold.

10. The method of claim 1, wherein transmitting said temporarily stored configuration data from the wireless communication circuit to the processing circuit comprises transmitting the temporarily stored configuration data via one of: a UART communication interface, a low-power UART communication interface, an SPI communication interface or an I²C communication interface.

11. A wireless device for use in a wireless sensor network, comprising:
- an energy harvester;
- an energy storage element coupled to the energy harvester;
- wherein the energy harvester and the energy storage element are configured to alternately harvest energy from a surrounding environment and release energy for supplying the wireless device in a sequence of energy harvesting cycles;
- a processing circuit; and
- a wireless communication circuit configured to:
  - i) transmit towards a base station a signal indicative of said wireless communication circuit entering a receiving operation mode;
  - ii) in response to said wireless communication circuit entering the receiving operation mode, receive configuration data from the base station and temporarily store the received configuration data in a memory area of said wireless communication circuit; and
  - iii) transmit to the processing circuit said temporarily stored configuration data;
- wherein the processing circuit is configured to store the configuration data in a memory area of said processing circuit;
- wherein steps ii) and iii) are carried out during distinct energy harvesting cycles of the wireless device.

12. The wireless device of claim 11, wherein the wireless communication circuit is configured to periodically switch between a transmitting operation mode and said receiving operation mode.

13. The wireless device of claim 11, wherein the wireless communication circuit comprises a Bluetooth-based radio.

14. The wireless device of claim 11, wherein the processing circuit and the wireless communication circuit are configured to exchange signals therebetween in half-duplex mode.

15. The wireless device of claim 11, wherein a communications interface between the processing circuit and the wireless communication circuit comprises one of: a UART communication interface, a low-power UART communication interface, an SPI communication interface or an I²C communication interface.

* * * * *